US010665065B2

(12) United States Patent
Faletti et al.

(10) Patent No.: US 10,665,065 B2
(45) Date of Patent: May 26, 2020

(54) AUTOMATED TELLER MACHINE (ATM) DEVICE WITH SEALED SLOT

(71) Applicant: Capital One Services, LLC, McLean, VA (US)

(72) Inventors: Steve Faletti, Brooklyn, NY (US); David Kelly Wurmfeld, Fairfax, VA (US); Lisa Whitsitt, Millbrae, CA (US); Janak Dadhaniya, San Francisco, CA (US); Robert Smith, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/039,910

(22) Filed: Jul. 19, 2018

(65) Prior Publication Data

US 2019/0333344 A1 Oct. 31, 2019

Related U.S. Application Data

(63) Continuation of application No. 15/963,913, filed on Apr. 26, 2018, now Pat. No. 10,049,532.

(51) Int. Cl.
*G06Q 40/00* (2012.01)
*G07F 19/00* (2006.01)

(52) U.S. Cl.
CPC .......... *G07F 19/203* (2013.01); *G07F 19/202* (2013.01); *G07F 19/205* (2013.01); *G07F 19/2055* (2013.01)

(58) Field of Classification Search
CPC .... G07F 19/20; G07F 19/201; G06Q 20/1085
USPC .......................................................... 235/379
See application file for complete search history.

(56) References Cited

U.S. PATENT DOCUMENTS

| | | | | |
|---|---|---|---|---|
| 3,897,901 | A | 8/1975 | Grosswiller, Jr. et al. | |
| 3,957,173 | A | 5/1976 | Roudebush | |
| 4,251,009 | A * | 2/1981 | McLaughlin | G07F 19/20 221/12 |
| 5,454,332 | A | 10/1995 | Fennelly et al. | |
| 5,676,231 | A | 10/1997 | Legras et al. | |
| 5,760,380 | A | 6/1998 | May | |
| 7,044,331 | B2 | 5/2006 | Lee | |
| 8,517,479 | B2 | 8/2013 | Lee | |

(Continued)

FOREIGN PATENT DOCUMENTS

| | | | |
|---|---|---|---|
| EP | 0471300 | A2 | 2/1992 |
| EP | 3236435 | A1 | 10/2017 |
| GB | 2219120 | A | 11/1989 |

OTHER PUBLICATIONS

Co-pending U.S. Appl. No. 15/963,913, filed Apr. 26, 2018, entitled "Automated Teller Machine (ATM) Device With Sealed Slot," by Steve Faletti et al., 38 pages.

(Continued)

*Primary Examiner* — Ahshik Kim
(74) *Attorney, Agent, or Firm* — Harrity & Harrity, LLP

(57) ABSTRACT

A device may include a first slot on a front portion of the device, and a security bar in an interior of the device. The security bar may comprise a second slot. The device may be configured to rotate the security bar to align the first slot and the second slot. Alignment of the first slot and the second slot may facilitate a transfer between the interior of the device and an exterior of the device.

20 Claims, 10 Drawing Sheets

(56) References Cited

U.S. PATENT DOCUMENTS

| | | | | |
|---|---|---|---|---|
| 8,701,859 | B2 * | 4/2014 | Takashima | G07F 19/205 109/64 |
| 8,810,166 | B2 | 8/2014 | Nagao | |
| 2013/0153653 | A1 | 6/2013 | Wilson | |
| 2016/0371664 | A1 | 12/2016 | Suttie et al. | |

OTHER PUBLICATIONS

Extended European Search Report for Application No. EP19170822.1, dated Jul. 23, 2019, 10 pages.

* cited by examiner

AUTOMATED TELLER MACHINE (ATM) DEVICE WITH SEALED SLOT

CROSS-REFERENCE TO RELATED APPLICATIONS UNDER 35 U.S.C. § 120

This application is a continuation of U.S. patent application Ser. No. 15/963,913, filed on Apr. 26, 2018, entitled "AUTOMATED TELLER MACHINE (ATM) DEVICE WITH SEALED SLOT," which is hereby expressly incorporated by reference herein.

BACKGROUND

An automated teller machine (ATM) device is an electronic device that provides customers of a financial institution with the capability to perform financial transactions. For example, a financial transaction may include a cash withdrawal, a deposit, a transfer of funds, obtaining account information, and/or the like. For some ATM devices, a customer may be identified by inserting a transaction card into the ATM device.

SUMMARY

According to some possible implementations, an automated teller machine (ATM) device may include a first slot on a front portion of the ATM device, and a security bar that is aligned in parallel with the first slot. A leverage point of the security bar may be in an interior of the ATM device. The security bar may comprise a second slot. The ATM device may be configured to rotate the security bar to align the first slot and the second slot. Alignment of the first slot and the second slot may facilitate a transfer between the interior of the ATM device and an exterior of the ATM device.

According to some possible implementations, a device may include a first slot on a front portion of the device. The first slot may be configured to receive or output cash. The device may include a security bar that is aligned in parallel with the first slot. A leverage point of the security bar may be in an interior of the device. The security bar may comprise a second slot. The device may include a compartment in the interior of the device around the security bar. The compartment may comprise a third slot. The device may be configured to rotate the security bar into a first position to align the first slot, the second slot, and the third slot to receive or to output the cash.

According to some possible implementations, a cash-dispensing device may include a first slot on a front portion of the cash-dispensing device, and a security bar in an interior of the cash-dispensing device. The security bar may comprise a second slot. The cash-dispensing device may be configured to rotate the security bar to align the first slot and the second slot. Alignment of the first slot and the second slot may facilitate a transfer between the interior of the cash-dispensing device and an exterior of the cash-dispensing device.

DETAILED DESCRIPTION

The following detailed description of example implementations refers to the accompanying drawings. The same reference numbers in different drawings may identify the same or similar elements.

An ATM device may include a slot with a door for outputting cash in association with a withdrawal, receiving cash and/or a check in association with a deposit, outputting a receipt for a transaction, and/or the like. The door may comprise a thin piece of plastic and/or metal that creates a security vulnerability for the ATM device. For example, a malicious actor may be capable of using a tool to pry the door open to access the ATM device interior and/or to subject the ATM device to a gas attack, to puncture the door for similar purposes, and/or the like.

Some implementations described herein provide an ATM device configured with a security bar that can be rotated to various positions to facilitate a transfer between an ATM device interior and an ATM device exterior. In this way, the security bar reduces or eliminates a need for the ATM device to be configured with a door. This reduces or eliminates security vulnerabilities associated with the door, thereby improving security of the ATM device. In addition, this simplifies a mechanical operation of elements used to facilitate a transfer between the ATM device interior and the ATM device exterior, thereby reducing or eliminating a risk of mechanical failure related to the door, conserving costs associated with repairing the ATM device, and/or the like. Further, this mechanically strengthens a slot used to facilitate a transfer between the ATM device interior and the ATM device exterior, thereby improving a security of the ATM device and/or reducing or eliminating security vulnerabilities associated with the door.

Figure 1A:
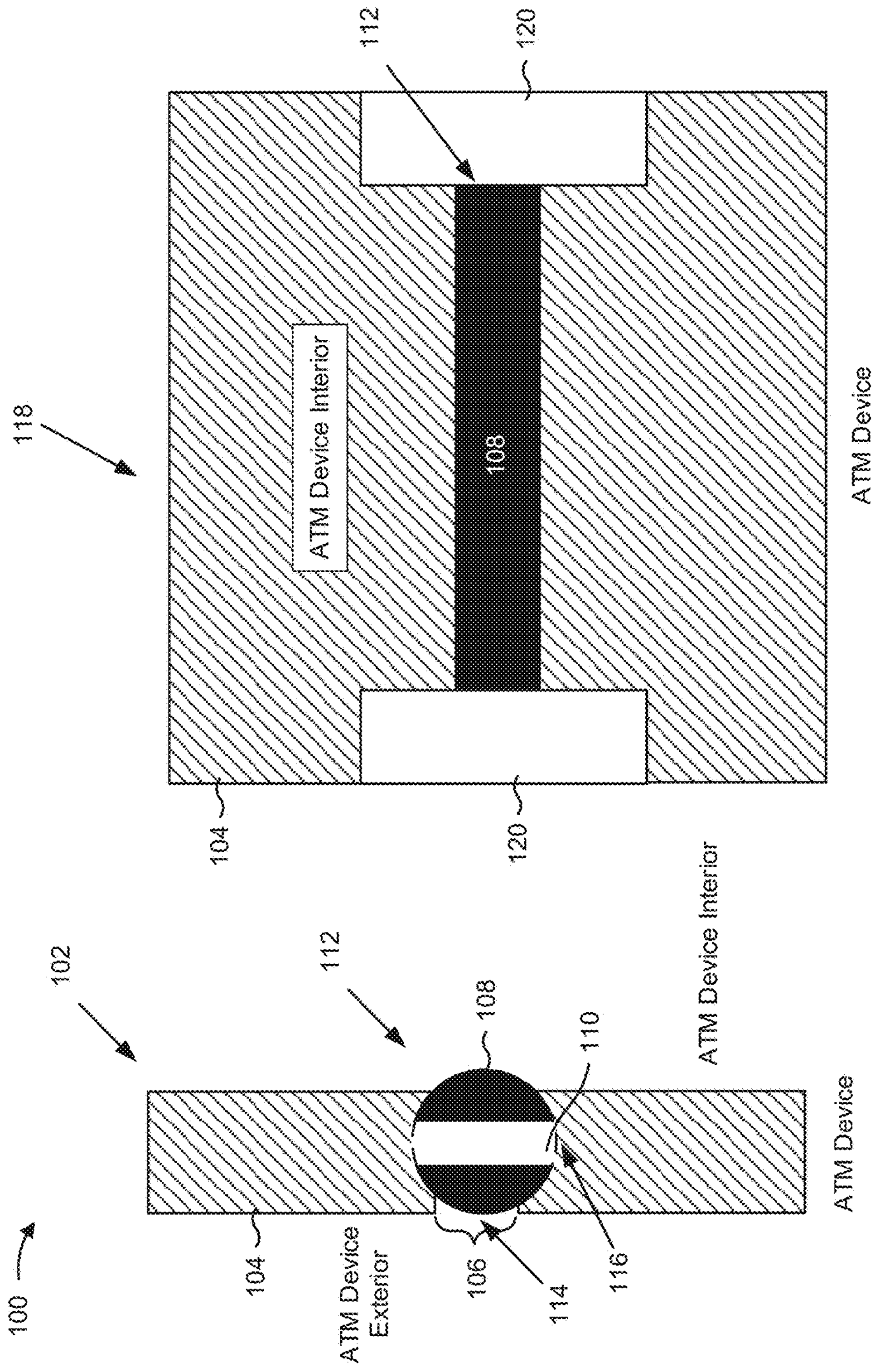
FIGS. 1A and 1B are diagrams of an overview of an example implementation described herein.
Figure 1B:
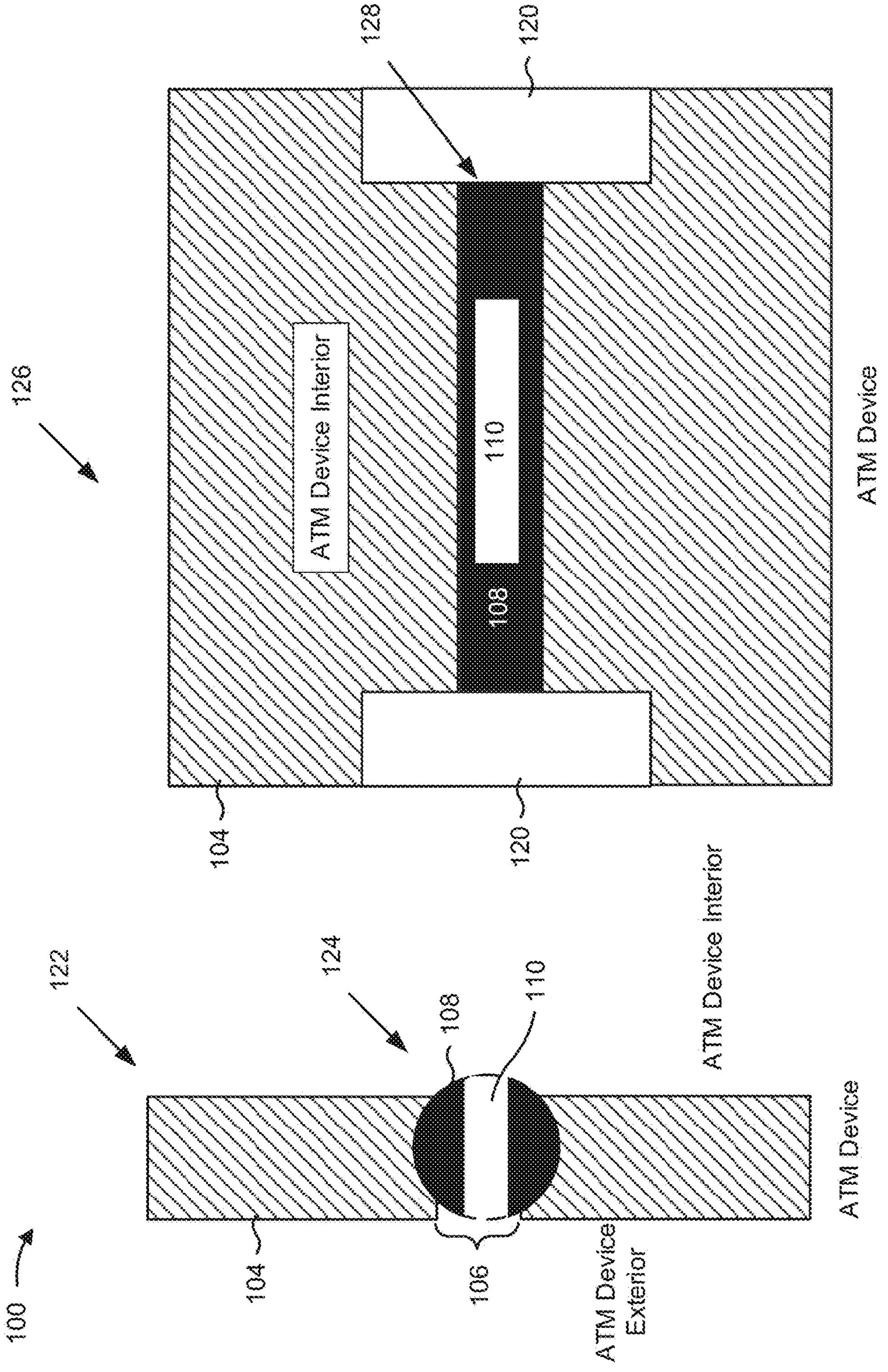

FIGS. 1A and 1B are diagrams of an overview of an example implementation 100 described herein. FIGS. 1A and 1B show various views of an ATM device (e.g., a cash-dispensing device).

Reference number 102 shows a cross-sectional side view of a front portion of the ATM device. In some implementations, the front portion of the ATM device may include a front wall 104. For example, front wall 104 may comprise metal, plastic, and/or the like. In some implementations, front wall 104 may be a single panel. Conversely, in some implementations, front wall 104 may be multiple panels. In some implementations, front wall 104 may include a first slot 106 (e.g., a cash dispenser and/or a deposit slot). For example, first slot 106 may facilitate a transfer between an ATM device interior and an ATM device exterior. Continuing with the previous example, a transfer may include a deposit of cash or a check, withdrawal of cash, output of a receipt, output of a replacement transaction card, and/or the like.

In some implementations, the ATM device may include a security bar 108 aligned in parallel with first slot 106. For example, security bar 108 may be positioned between panels of front wall 104, within front wall 104, and/or the like. In some implementations, security bar 108 may comprise metal, plastic, carbon fiber, and/or the like. In some implementations, security bar 108 may be formed during a single casting (e.g., security bar 108 may be formed as a single unit, rather than as multiple portions that are fused together). This increases a durability of security bar 108, thereby reducing a vulnerability of security bar 108 to tampering and/or damage. In addition, use of security bar 108 simplifies a mechanical operation related to sealing first slot 106 relative to a door (e.g., rotation of security bar 108 relative to opening and closing of a door), thereby reducing or eliminating mechanical failure that would otherwise occur with a door, which conserves resources and/or costs associated with repairing the door. Further, this simplifies manufacturing of the ATM device relative to another ATM device that includes a door, thereby conserving costs and/or resources associated with manufacturing the ATM device. In some implementations, a cross-section of security bar 108 may have a circular shape. This reduces or eliminates leverage points that would otherwise be present with a door.

In some implementations, security bar 108 may include a second slot 110. For example, security bar 108 may be configured such that second slot 110 aligns with first slot 106 when security bar 108 has been rotated into a particular position (e.g., to facilitate a transfer between the ATM device interior and the ATM device exterior), as described in more detail elsewhere herein. Reference number 112 shows security bar 108 in a first position. As shown by reference number 114, when security bar 108 is in the first position, first slot 106 and second slot 110 are not aligned with each other, thereby preventing access to the ATM device interior and/or preventing a transfer between the ATM device interior and the ATM device exterior. In some implementations, a width (e.g., a vertical dimension) of first slot 106 may be narrower than a diameter of security bar 108. As such, and as further shown by reference number 114, when security bar 108 is in the first position, security bar 108 may block first slot 106.

As shown by reference number 116, when security bar 108 is in the first position, second slot 110 may not be exposed to the ATM device exterior. Additionally, or alternatively, and as further shown by reference number 116, security bar 108 may be positioned within a groove or recess of front wall 104, such that second slot 110 is within the groove or recess. Additionally, or alternatively, and as further shown by reference number 116, a leverage point of security bar 108 (e.g., a point corresponding to reference number 116), may be located within the ATM device interior, thereby reducing or eliminating access to the leverage point from the ATM device exterior. The combination of these features increase a difficulty of using second slot 110 as a point of leverage for rotating security bar 108 to align first slot 106 and second slot 110, thereby increasing a security of the ATM device relative to another ATM device that includes a door on the front panel of the ATM device (e.g., where a seam between the door and the front panel would be easily accessible from an exterior of the other ATM device and/or could provide multiple leverage points for prying the door open).

Reference number 118 shows a view of the ATM device interior (e.g., shows an interior side of front wall 104). In some implementations, the ATM device may include a set of motors 120. For example, the set of motors 120 may be configured to rotate security bar 108 into multiple positions (e.g., the first position described above with respect to reference numbers 112 through 116 and/or a second potion described elsewhere herein). Although, FIG. 1A shows the ATM device as including two motors 120 connected to the ends of security bar 108, the ATM device may include a different configuration of motors 120 (e.g., a single motor 120 at one end of security bar 108).

Turning to FIG. 1B, reference number 122 shows another cross-sectional side view of a front portion of the ATM device. Reference number 124 shows security bar 108 in a second position. For example, when security bar 108 is in the second position, first slot 106 and second slot 110 may be aligned to facilitate a transfer between the ATM device interior and the ATM device exterior. In some implementations, the set of motors 120 may have rotated security bar 108 from the first position to the second position to facilitate the transfer, as described elsewhere herein.

In some implementations, the set of motors 120 may maintain security bar 108 in the second position until the transfer is complete. For example, a sensor (not shown in FIG. 1B) associated with the ATM device may be configured to detect that a user of the ATM device has removed cash and/or a receipt that the ATM device output via first slot 106 and/or second slot 110, to detect that a user of the ATM device has input cash and/or a check via first slot 106 and/or second slot 110, and/or the like. In some implementations, the set of motors 120 may rotate security bar 108 from the first position to the second position after a sensor associated with the ATM device has detected that a transfer is complete, after the ATM device has determined that a timer has expired, after the ATM device has determined that a threshold amount of time has elapsed since the set of motors 120 rotated security bar 108 into the second position based on a clock and/or a timer, and/or the like.

Reference number 126 shows another view of the ATM device interior (e.g., shows another view of the interior side of front wall 104). As shown by reference number 128, when security bar 108 is in the second position, second slot 110 may be aligned with first slot 106.

In this way, security bar 108 may be configured to facilitate a transfer between the ATM device interior and the ATM device exterior and/or to secure first slot 106. This reduces or eliminates a capability of a malicious actor to access the ATM device interior, relative to the ATM device being configured with a door over a cash dispenser and/or a deposit slot of the ATM device. In addition, this provides a more structurally secure mechanism for securing a deposit slot and/or a cash dispenser of the ATM relative to using a door associated with the deposit slot and/or the cash dispenser, thereby increasing a security of the ATM device. Further, this simplifies mechanical operation of components related to facilitating a transfer between the ATM device interior and the ATM device exterior relative to using a door associated with a cash dispenser and/or a deposit slot, thereby conserving resources and/or costs associated with repairing the ATM device.

As indicated above, FIGS. 1A and 1B are provided merely as an example. Other examples are possible and may differ from what was described with regard to FIGS. 1A and 1B. In some implementations, the ATM device may include additional elements, fewer elements, different elements, or differently arranged elements than those shown in FIGS. 1A and 1B. In addition, FIGS. 1A and 1B may show a simplified version of elements of the ATM device for explanatory and/or illustrative purposes.

Figure 2A:
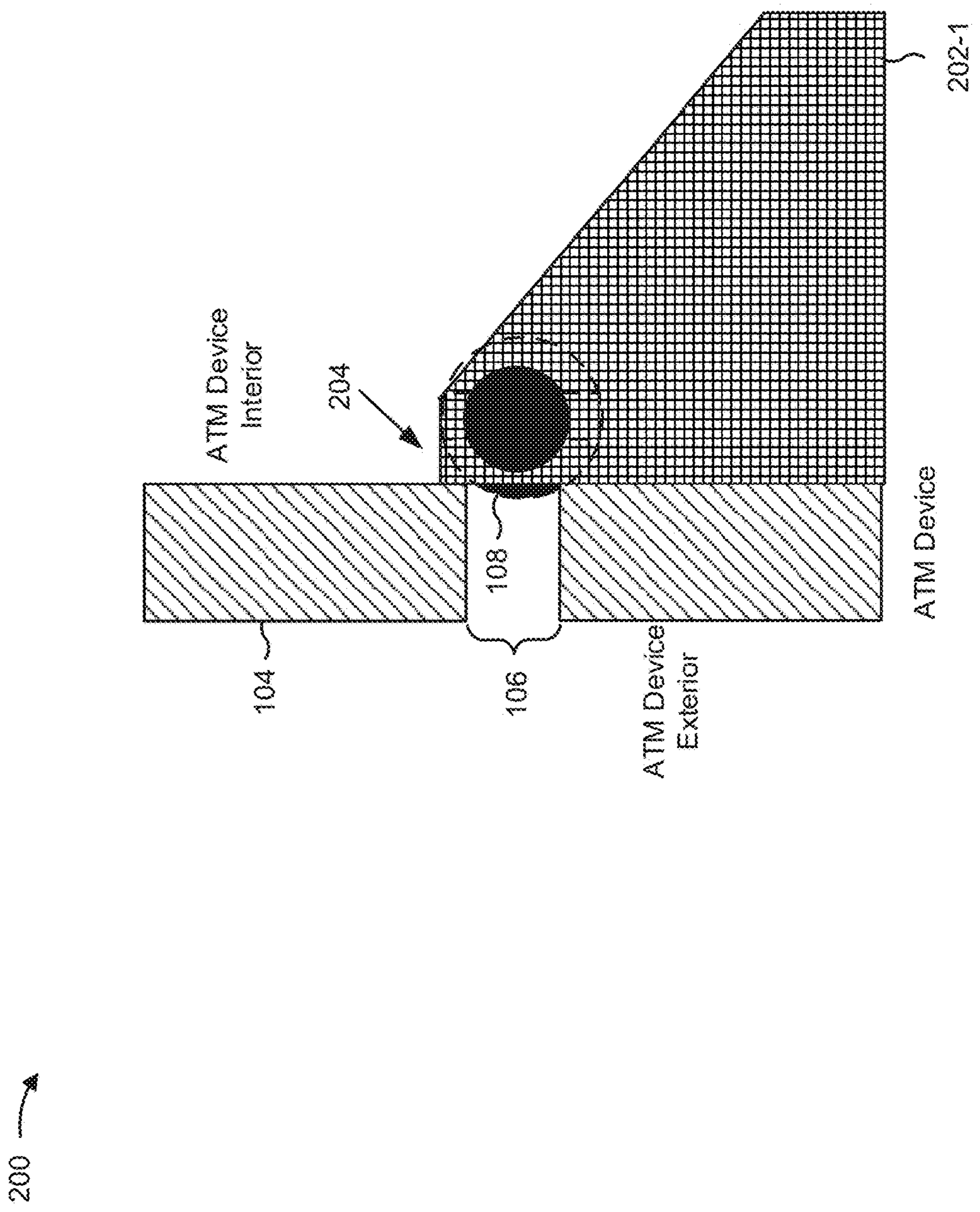
FIGS. 2A and 2B are diagrams depicting various cross-sectional views of an automated teller machine (ATM) device with sealed slot.
Figure 2B:
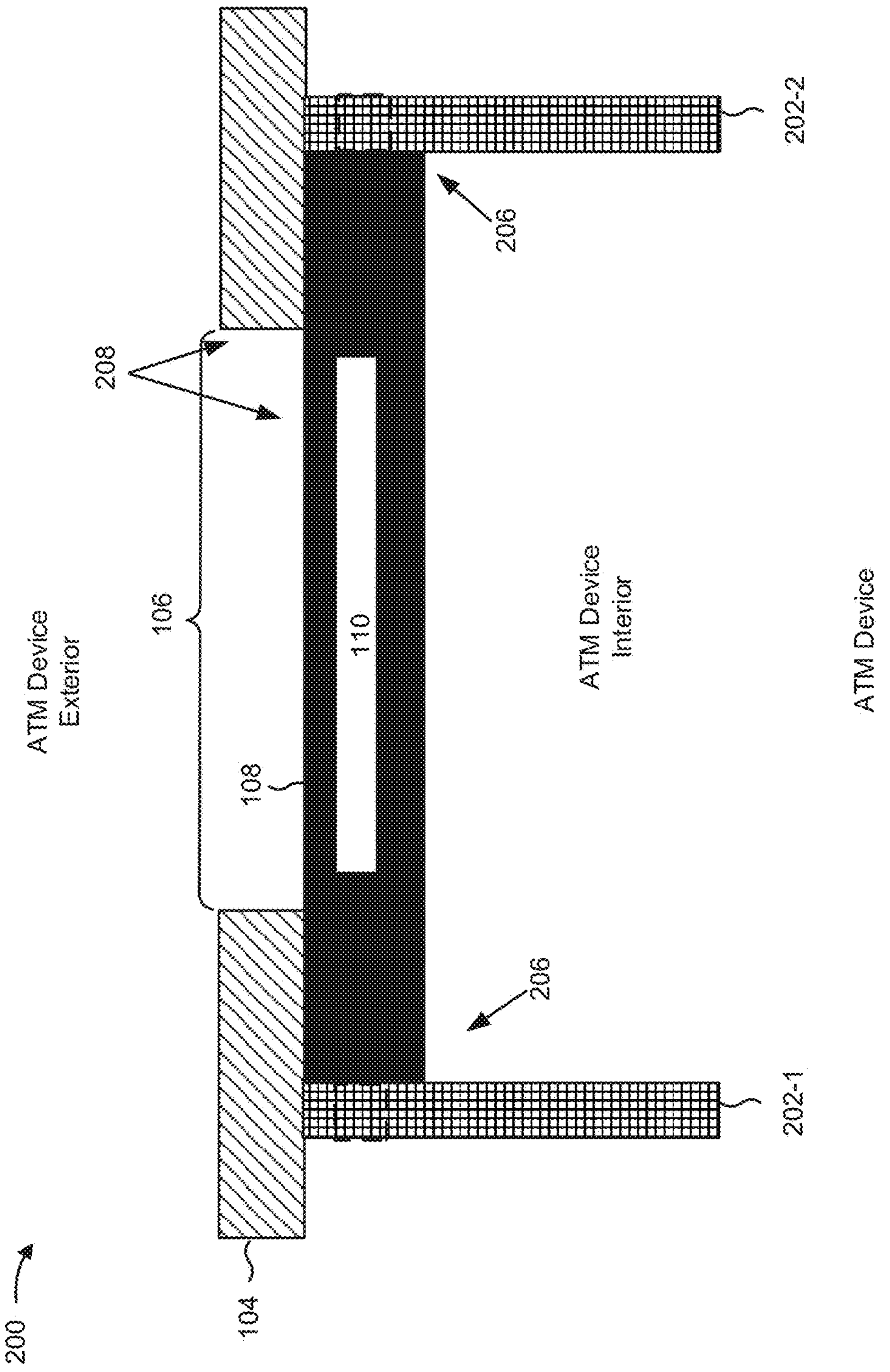

FIGS. 2A and 2B are diagrams 200 depicting various cross-sectional views of an ATM device with a sealed slot. FIG. 2A shows a cross-sectional side view of the ATM device. In some implementations, the ATM device may include a set of support structures 202 (e.g., support structure 202-1, shown in FIGS. 2A and 2B, and support structure 202-2, which is not shown in FIG. 2A). In some implementations, the set of support structures 202 may comprise metal, plastic, carbon fiber, and/or the like. In some implementations, the set of support structures 202 may be welded or otherwise attached to a frame of the ATM device (e.g., within the ATM device interior). This provides mechanical support for support structures 202. As shown by reference number 204, the set of support structures 202 may provide mechanical support to security bar 108 so that security bar 108 is aligned in parallel with first slot 106. Additionally, or alternatively, the set of support structures 202 may provide mechanical reinforcement to security bar 108. For example, the mechanical reinforcement that the set of support structures 202 provides may prevent security bar 108 from being pushed further into the ATM device interior by pressure applied from the ATM device exterior via first slot 106. This increases a security of the ATM device relative to using a door in place of security bar 108, which can be pried open, forced inward, and/or the like.

Turing to FIG. 2B, FIG. 2B shows a cross-sectional top-view of the ATM device. As shown by reference numbers 206, the ATM device may include multiple support structures 202 (e.g., shown as support structures 202-1 and 202-2) at ends of security bar 108. Although FIG. 2B shows the ATM device as including two support structures 202, other configurations are possible. As shown by reference number 208, a length of security bar 108 (e.g., a horizontal dimension) may be longer than a length (e.g., a horizontal dimension) of first slot 106. This reduces or eliminates access to a leverage point at an end of security bar 108 via first slot 106, thereby improving a security of the ATM device.

As indicated above, FIGS. 2A and 2B are provided merely as an example. Other examples are possible and may differ from what was described with regard to FIGS. 2A and 2B. In some implementations, the ATM device may include additional elements, fewer elements, different elements, or differently arranged elements than those shown in FIGS. 2A and 2B. For example, the ATM device may include a set of motors 120 configured to rotate security bar 108. In addition, FIGS. 2A and 2B may show a simplified version of elements of the ATM device for explanatory and/or illustrative purposes.

Figure 3:
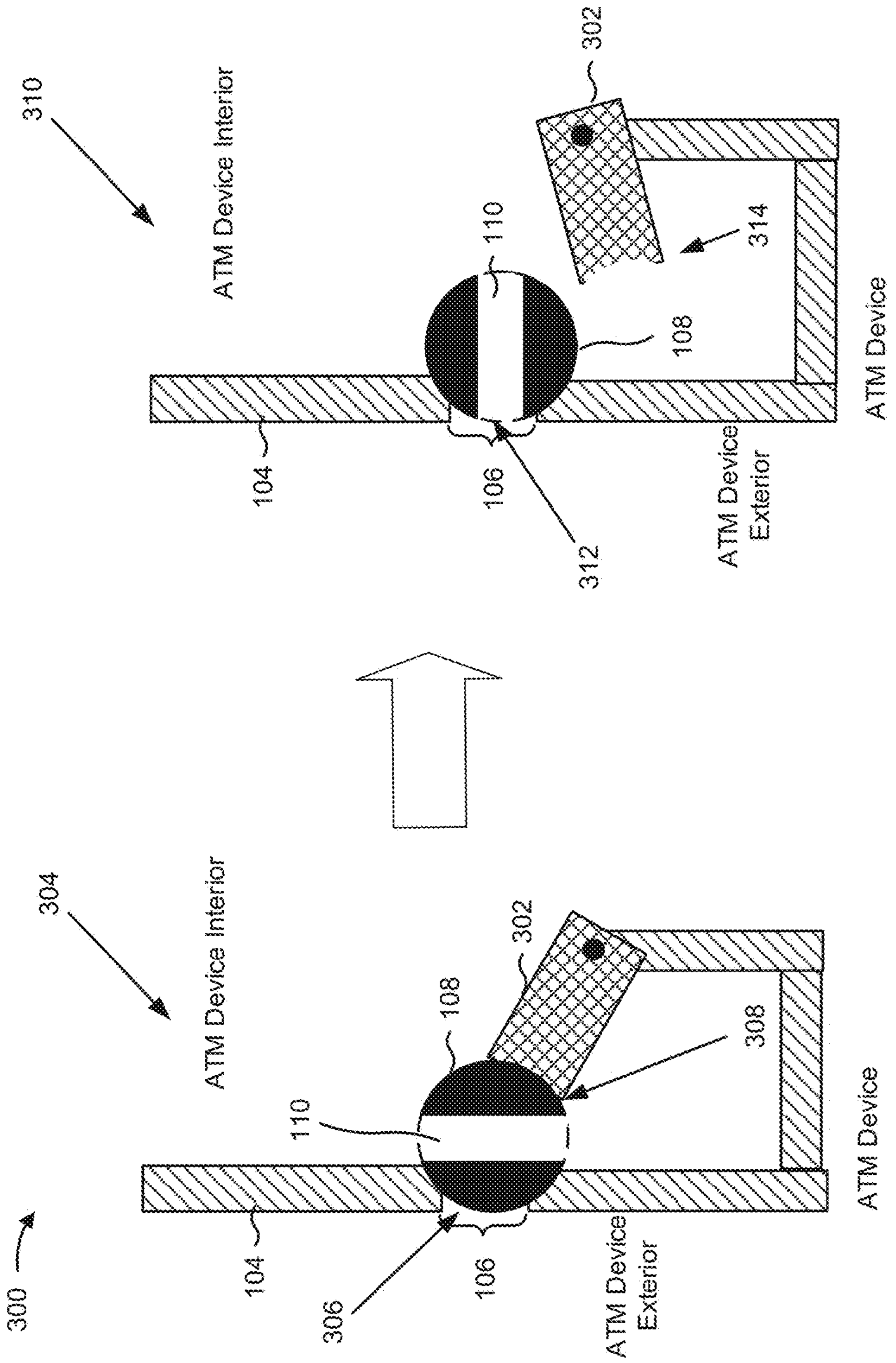
FIG. 3 is a diagram depicting various additional cross-sectional views of an ATM device with sealed slot.

FIG. 3 is a diagram 300 depicting various additional cross-sectional views of an ATM device with a sealed slot. In some implementations, the ATM device may include a set of support structures 302. In some implementations, the set of support structures 302 may be similar to the set of support structures 202 described with regard to FIGS. 2A and 2B. For example, the set of support structures 302 may be configured to structurally support and/or reinforce security bar 108, but may be further configured to pivot about an axis (e.g., to permit and/or block rotation of security bar 108 into various positions). Reference number 304 shows elements of the ATM device in corresponding first positions. As shown by reference number 306, security bar 108 may be in a first position where first slot 106 and second slot 110 are not aligned. As shown by reference number 308, when security bar 108 is in the first position, support structure 302 may be in a corresponding first position. For example, the first position of support structure 302 may structurally support and/or reinforce security bar 108 to prevent security bar 108 from being pushed further into the ATM device interior via pressure applied to security bar 108 from the ATM device exterior and via first slot 106. This increases a security of the ATM device relative to use of a door in place of security bar 108, relative to not using a set of support structures 302, and/or the like.

Reference number 310 shows elements of the ATM device in corresponding second positions. As shown by reference number 312, security bar 108 may be in a second position where first slot 106 and second slot 110 are aligned to facilitate a transfer between the ATM device exterior and the ATM device interior. As shown by reference number 314, when security bar 108 is in the second position, support structure 302 may be in a corresponding second position. For example, support structure 302 may have rotated about an axis to permit security bar 108 to rotate into the second position, so that second slot 110 is not obstructed when aligned with first slot 106, and/or the like.

As indicated above, FIG. 3 is provided merely as an example. Other examples are possible and may differ from what was described with regard to FIG. 3. In some implementations, the ATM device may include additional elements, fewer elements, different elements, or differently arranged elements than those shown in FIG. 3. For example, the ATM device may include a set of motors 120 configured to rotate security bar 108 and/or support structure 302. In addition, FIG. 3 may show a simplified version of elements of the ATM device for explanatory and/or illustrative purposes.

Figure 4:
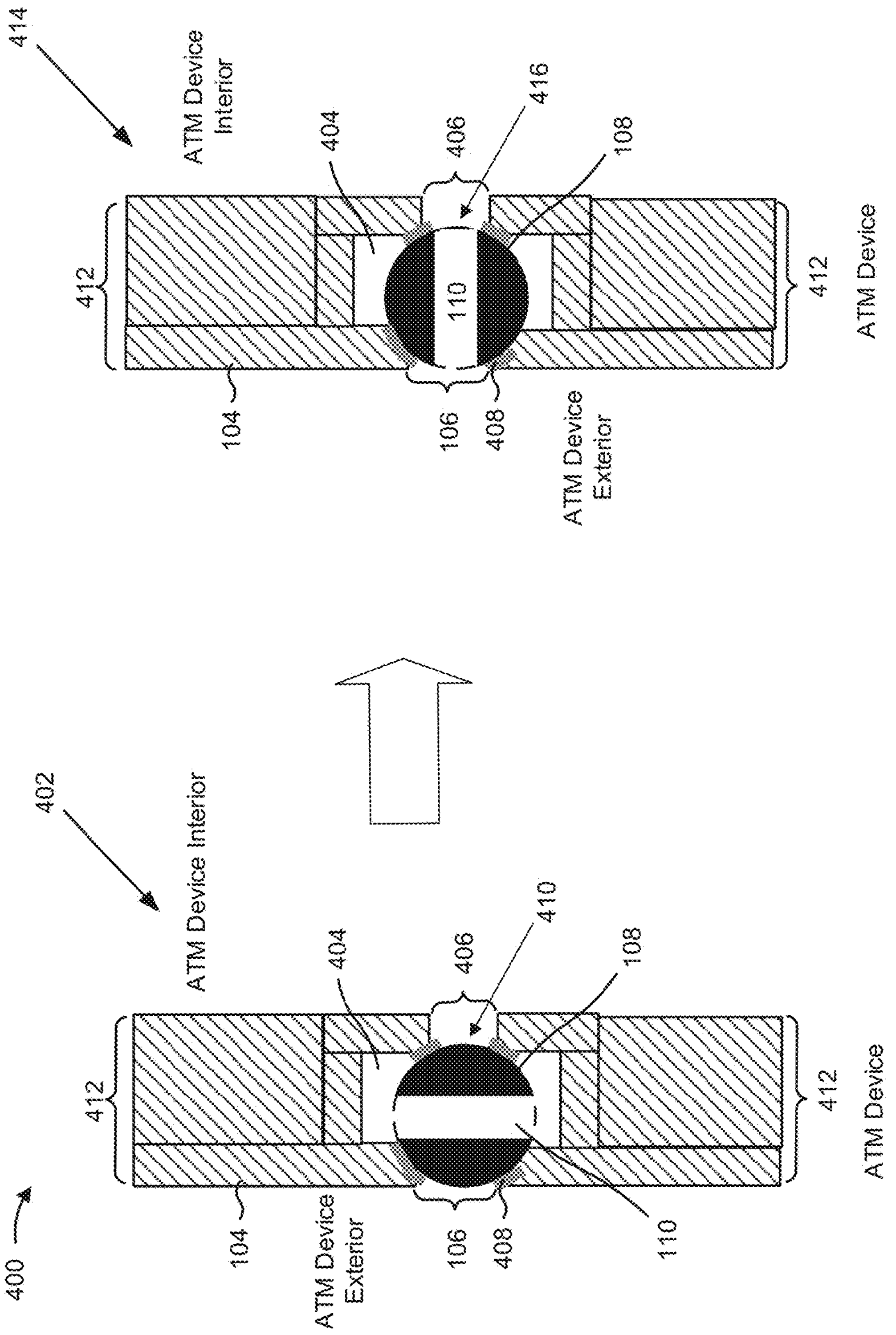
FIG. 4 is a diagram depicting various additional cross-sectional views of an ATM device with sealed slot.

FIG. 4 a diagram 400 depicting various additional cross-sectional views of an ATM device with sealed slot. Reference number 402 shows a first cross-sectional view of the ATM device with one or more elements of the ATM device configured in a first position. For example, security bar 108 may be in a first position where first slot 106 and second slot 110 are not aligned. In some implementations, the ATM device may include a compartment 404 in the ATM device interior. In some implementations, compartment 404 may be formed within front wall 104 and/or may be configured around a portion of security bar 108 that includes second slot 110.

In some implementations, the ATM device may include a set of o-ring seals associated with compartment 404. For example, the ATM device may include a first o-ring seal around a first end of security bar 108 at a first end of compartment 404 (e.g., to seal compartment 404 at the first end of compartment 404, such as when a wall of compartment 404 at the first end of compartment 404 is around security bar 108 and is not sealed). Additionally, or alternatively, and as another example, the ATM device may include a second o-ring seal around a second end of security bar 108 at a second end of compartment 404 (e.g., to seal compartment 404 at the second end of compartment 404, such as when a wall of compartment 404 at the second end of compartment 404 is around security bar 108 and is not sealed). This seals compartment 404, thereby preventing and/or reducing a risk of a gas, used during a gas attack against the ATM device, from entering the ATM device interior.

In some implementations, compartment 404 may include a third slot 406. In some implementations, alignment of first slot 106, second slot 110, and third slot 406 may facilitate a transfer between the ATM device interior and the ATM device exterior. In some implementations, the ATM device may include a set of lateral seals 408. For example, the set of lateral seals 408 may be configured along the length of security bar 108 around first slot 106 and/or third slot 406. In some implementations, the set of lateral seals 408 may provide weather proofing functions for first slot 106 and/or third slot 406, may provide padding to account for variations in a size of security bar 108, may protect security bar 108 from damage from edges of first slot 106 and/or third slot 406 during rotation of security bar 108, may prevent leakage of gas, associated with a gas attack, from entering the ATM device interior, and/or the like. As shown by reference number 410, when security bar 108 is in the first position, security bar 108 may block third slot 406 in addition to first slot 106 to prevent a transfer between the ATM device exterior and the ATM device interior and/or to prevent access to the ATM device interior.

In some implementations, and as shown by reference number 412, compartment 404 may facilitate use of a thicker front wall 104 relative to another front wall 104 that does not include compartment 404. This improves a security of the ATM device as a thicker front wall 104 may be more difficult to puncture relative to a thinner front wall 104, may provide additional protection to security bar 108, and/or the like.

Reference number 414 shows a second cross-sectional view of the ATM device with one or more elements of the ATM device configured in a second position. For example, security bar 108 may be in a second position where first slot 106 and second slot 110 are aligned. As shown by reference number 416, when security bar 108 is in the second position, first slot 106, second slot 110, and third slot 406 may be aligned to facilitate a transfer between the ATM device exterior and the ATM device interior.

As indicated above, FIG. 4 is provided merely as an example. Other examples are possible and may differ from what was described with regard to FIG. 4. In some implementations, the ATM device may include additional elements, fewer elements, different elements, or differently arranged elements than those shown in FIG. 4. For example, the ATM device may include a set of motors 120 configured to rotate security bar 108. In addition, FIG. 4 may show a simplified version of elements of the ATM device for explanatory and/or illustrative purposes.

Figure 5:
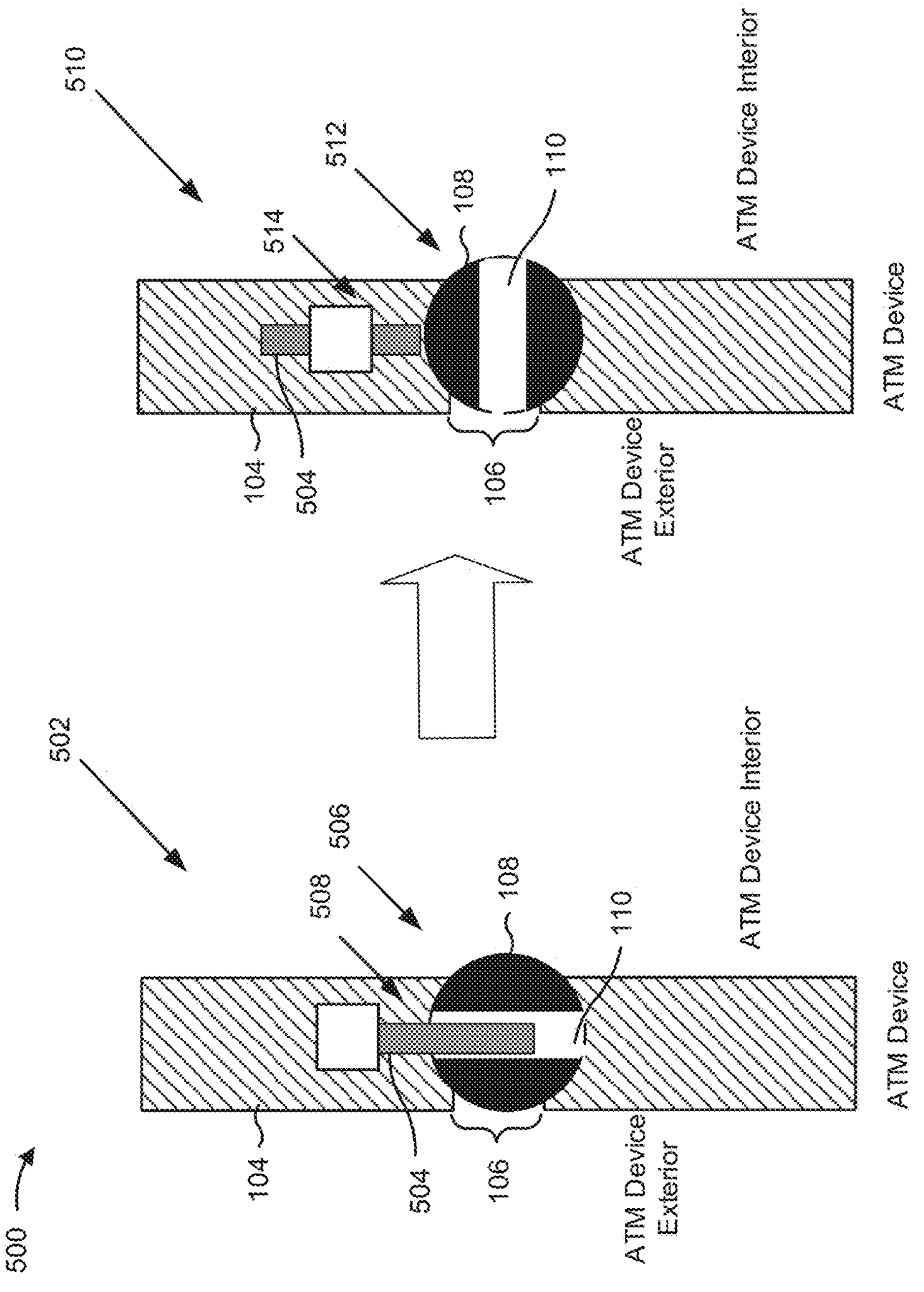
FIG. 5 is a diagram depicting various additional cross-sectional views of an ATM device with sealed slot.

FIG. 5 is a diagram 500 depicting various additional cross-sectional views of an ATM device with sealed slot. FIG. 5 shows operation of a lock 504 used to lock security bar 108 into a particular position.

Reference number 502 shows a first cross-sectional view of the ATM device with lock 504 in a first position. For example, lock 504 may include a motor (shown as the white box associated with lock 504) to drive a bolt (shown as the gray box associated with lock 504) into second slot 110 when security bar 108 is in a first position where first slot 106 and second slot 110 are not aligned (e.g., to block a transfer between an interior of the ATM device and an exterior of the ATM device). Additionally, or alternatively, lock 504 may be configured to retract the bolt to facilitate rotation of security bar 108 into a second position where first slot 106 and second slot 110 are aligned (e.g., to facilitate a transfer between the ATM device interior and the ATM device exterior).

As shown by reference number 506, security bar 108 may be in the first position, where second slot 110 is not aligned with first slot 106. As shown by reference number 508, the bolt of lock 504 may be in a first position where a motor of lock 504 has driven the bolt into second slot 110. In this way, lock 504 may lock security bar 108 in the first position. In addition, in this way, lock 504 may prevent security bar 108 from being forcefully rotated from the ATM device exterior, thereby increasing a security of the ATM device.

Reference number 510 shows a second cross-sectional view of the ATM device with lock 504 in a second position. As shown by reference number 512, security bar 108 is in a second position where first slot 106 and second slot 110 are aligned. As shown by reference number 514, the bolt of lock 504 may be in a second position where the bolt is retracted from second slot 110 (e.g., the motor of lock 504 may have retracted the bolt). In this way, lock 504 may retract the bolt to permit rotation of security bar 108.

As indicated above, FIG. 5 is provided merely as an example. Other examples are possible and may differ from what was described with regard to FIG. 5. In some implementations, the ATM device may include additional elements, fewer elements, different elements, or differently arranged elements than those shown in FIG. 5. For example, the ATM device may include a set of motors 120 configured to rotate security bar 108. In addition, FIG. 5 may show a simplified version of elements of the ATM device for explanatory and/or illustrative purposes.

Figure 6:
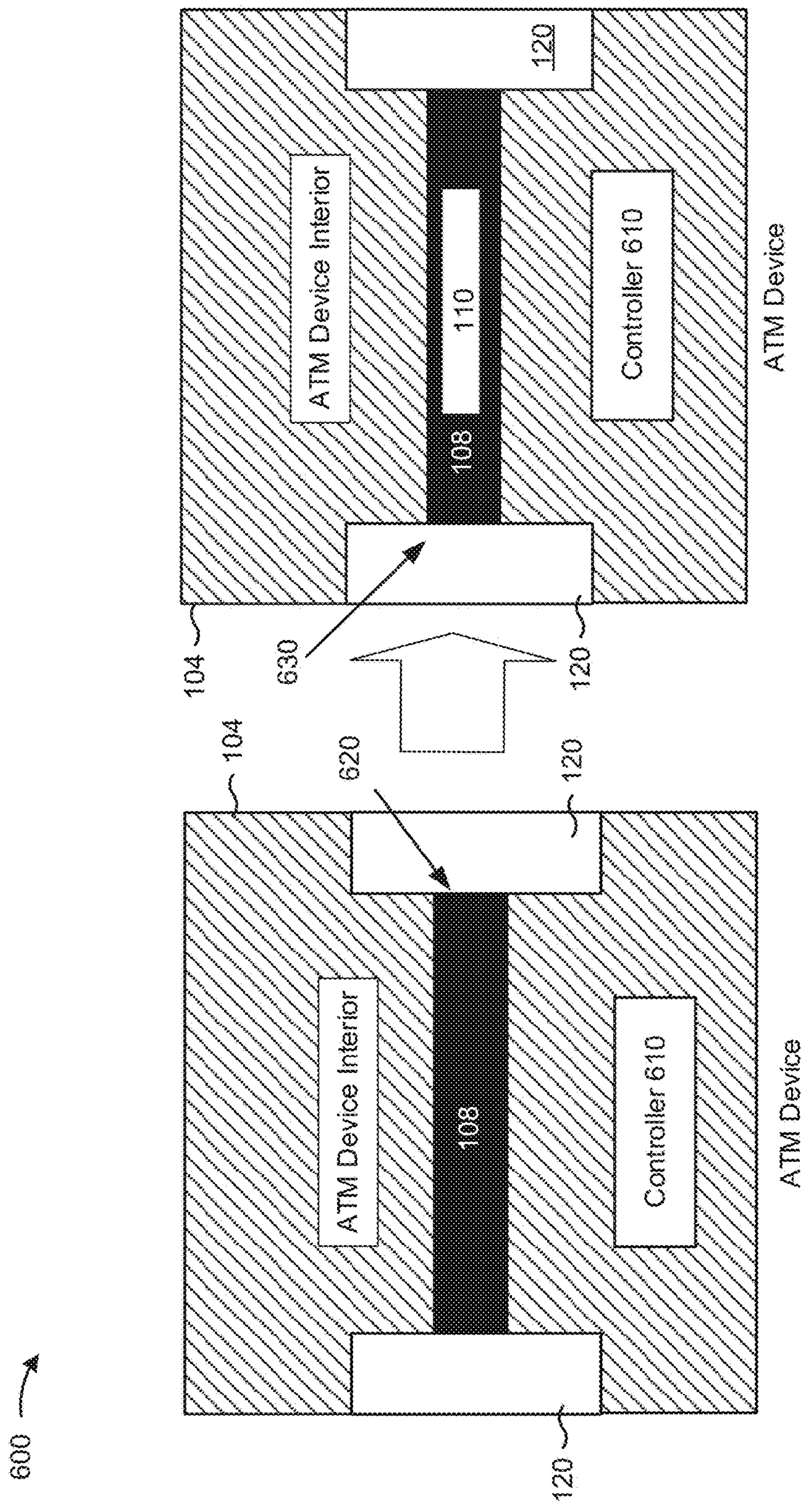
FIG. 6 is a diagram depicting various additional cross-sectional views of an ATM device with sealed slot.

FIG. 6 is a diagram 600 depicting various additional cross-sectional views of an ATM device with a sealed slot. In some implementations, the ATM device may include a controller 610. For example, controller 610 may include a component that is configured to cause a set of motors 120 to rotate security bar 108 into multiple positions. As shown by reference number 620, security bar 108 may be in a first position where first slot 106 (not shown in association with reference number 620) and second slot 110 (not shown in association with reference number 620) are not aligned. As shown by reference number 630, security bar 108 may be in a second position where first slot 106 (not shown in association with reference number 630) and second slot 110 are aligned. In some implementations, controller 610 may have caused the set of motors 120 to rotate security bar 108 from the first position to the second position and may cause the set of motors 120 to rotate security bar 108 back to the first position and/or to a third position after a transfer between the ATM device interior and the ATM device exterior has been completed.

As indicated above, FIG. 6 is provided merely as an example. Other examples are possible and may differ from what was described with regard to FIG. 6. In some implementations, the ATM device may include additional elements and/or components, fewer elements and/or components, different elements and/or components, or differently arranged elements and/or components than those shown in FIG. 6. In addition, FIG. 6 may show a simplified version of elements and/or components of the ATM device for explanatory and/or illustrative purposes.

Figure 7:
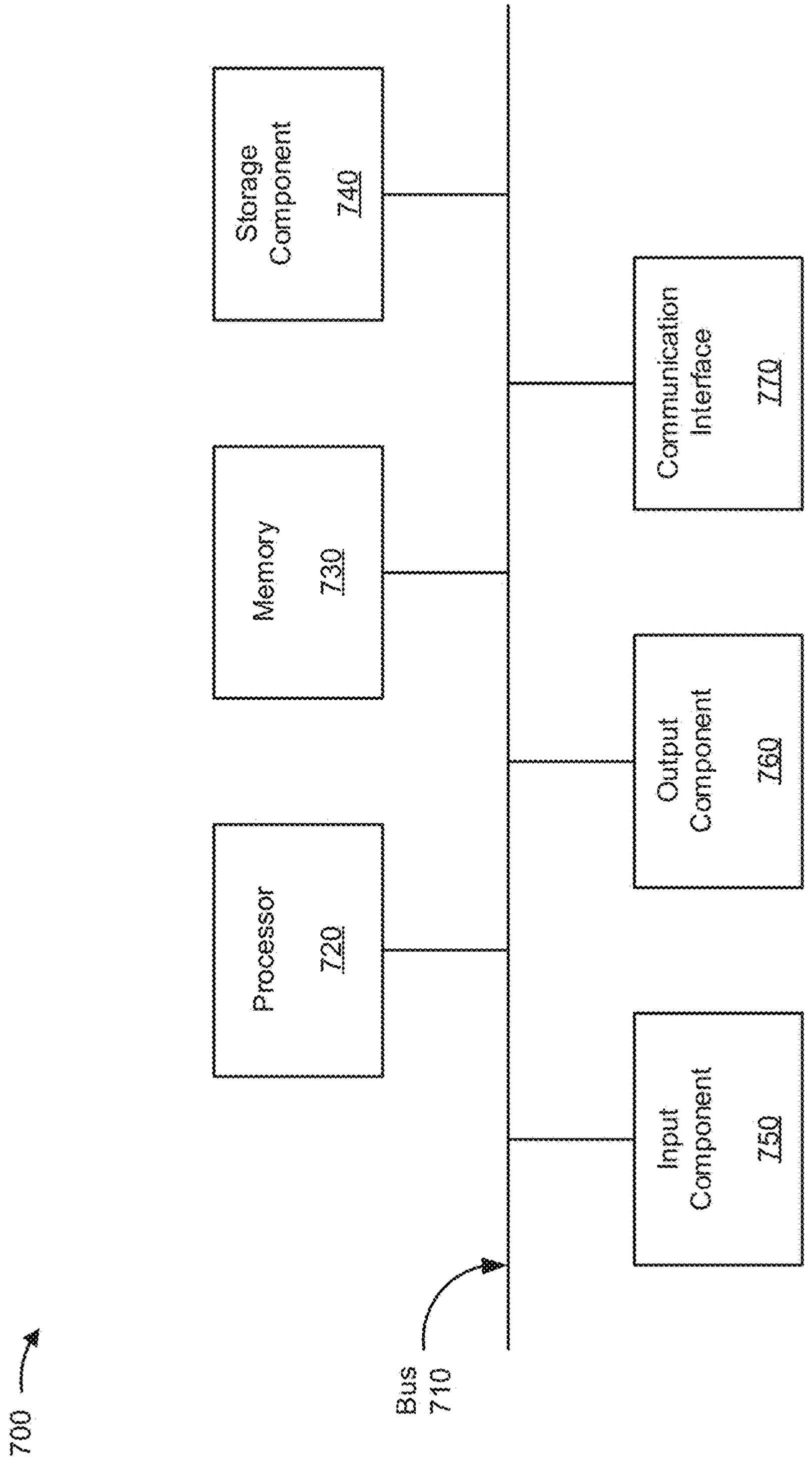
FIG. 7 is a diagram of one or more components of one or more devices described herein.

FIG. 7 is a diagram of example components of a device 700. Device 700 may correspond to an ATM device and/or controller 610. In some implementations, an ATM device and/or controller 610 may include one or more devices 700 and/or one or more components of device 700. As shown in FIG. 7, device 700 may include a bus 710, a processor 720, a memory 730, a storage component 740, an input component 750, an output component 760, and a communication interface 770.

Bus 710 includes a component that permits communication among the components of device 700. Processor 720 is implemented in hardware, firmware, or a combination of hardware and software. Processor 720 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 includes one or more processors capable of being programmed to perform a function. Memory 730 includes a random access memory (RAM), a read only memory (ROM), and/or another type of dynamic or static storage device (e.g., a flash memory, a magnetic memory, and/or an optical memory) that stores information and/or instructions for use by processor 720.

Storage component 740 stores information and/or software related to the operation and use of device 700. For example, storage component 740 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 750 includes a component that permits device 700 to receive information, such as via user input (e.g., a touch screen display, a keyboard, a keypad, a mouse, a button, a switch, and/or a microphone). Additionally, or alternatively, input component 750 may include a sensor for sensing information (e.g., a global positioning system (GPS) component, an accelerometer, a gyroscope, and/or an actuator). Output component 760 includes a component that provides output information from device 700 (e.g., a display, a speaker, and/or one or more light-emitting diodes (LEDs)).

Communication interface 770 includes a transceiver-like component (e.g., a transceiver and/or a separate receiver and transmitter) that enables device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, or the like.

Device 700 may perform one or more processes described herein. Device 700 may perform these processes based on processor 720 executing software instructions stored by a non-transitory computer-readable medium, such as memory 730 and/or storage component 740. A computer-readable medium is defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

Figure 8:
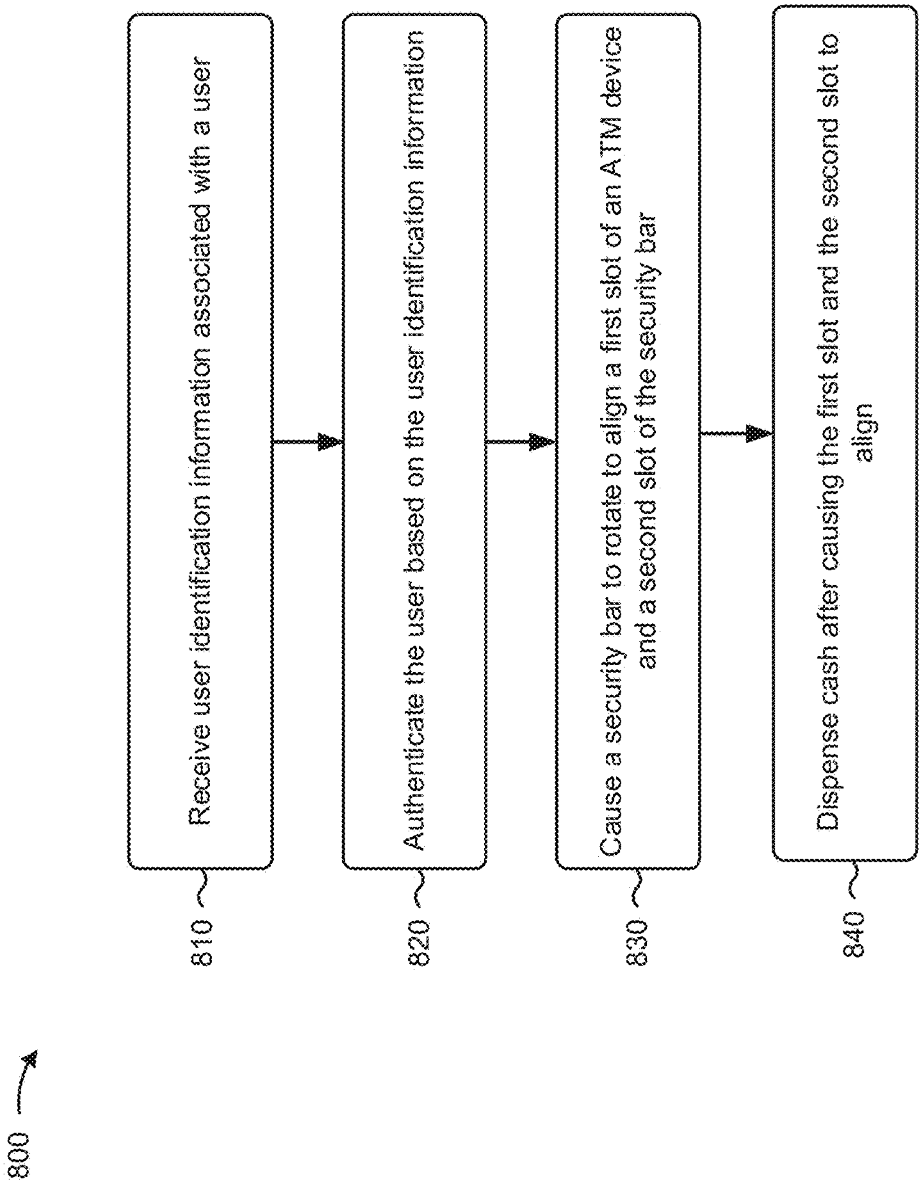
FIG. 8 is a flow chart of an example process for rotating a security bar included in an ATM device.

FIG. 8 is a flow chart of an example process 800 for rotating a security bar included in an ATM device. In some implementations, one or more process blocks of FIG. 8 may be performed by an ATM device. In some implementations, one or more process blocks of FIG. 8 may be performed by another device or a group of devices separate from or including the ATM device, such as controller 610.

As shown in FIG. 8, process 800 may include receiving user identification information associated with a user (block 810). For example, the ATM device (e.g., using controller 610, processor 720, input component 750, communication interface 770, and/or the like) may receive user identification information associated with a user. In some implementations, user identification information may include a personal identification number (PIN), a transaction card number, a security token, a username/password combination, biometric information, and/or the like that identifies a user of the ATM device. In some implementations, the ATM device may receive the user identification information when the user of the ATM device places a transaction card within communicative proximity of a reader associated with the ATM device (e.g., inserts the transaction card into a reader, swipes a magnetic strip of the transaction card along a reader, aligns a near-field communication (NFC) antenna of the transaction card with a reader, etc.). Additionally, or alternatively, the ATM device may receive the user identification information based on a user device (e.g., a mobile phone or a radiotelephone) being placed within communicative proximity of a reader of the ATM device. Additionally, or alternatively, the ATM device may receive the user identification information when the user of the ATM device uses an input component of the ATM device to input the user identification information.

In this way, the ATM device may receive user identification information prior to authenticating the user identification information.

As further shown in FIG. 8, process 800 may include authenticating the user based on the user identification information (block 820). For example, the ATM device (e.g., using controller 610, processor 720, memory 730, and/or the like) may authenticate the user based on the user identification information. In some implementations, the ATM device may verify user identification information input by a user of the ATM device with user identification information stored on a secure element of a transaction card placed within communicative proximity of a reader of the ATM device. Additionally, or alternatively, the ATM device may authenticate the user identification information using a data structure stored in memory resources of the ATM device. For example, the ATM device may perform a lookup, in the data structure, of information identifying a transaction card number of a transaction card placed within communicative proximity of a reader associated with the ATM device and a PIN input by a user of the ATM device to authenticate the user. Additionally, or alternatively, the ATM device may communicate with another device, such as a transaction backend device associated with an organization, to authenticate the user. For example, the ATM device may provide, to the transaction backend device, the user identification information via a network so that the transaction backend device can authenticate the user.

In this way, the ATM device may authenticate the user based on the user identification information prior to causing security bar 108 to rotate.

As further shown in FIG. 8, process 800 may include causing a security bar to rotate to align a first slot of the ATM device and a second slot of the security bar (block 830). For example, the ATM device (e.g., using motor 120, controller 610, processor 720, and/or the like) may cause security bar 108 to rotate to align first slot 106 of the ATM device and second slot 110 of security bar 108 (e.g., to facilitate a transfer between an interior of the ATM device and an exterior of the ATM device). In some implementations, the ATM device may cause security bar 108 to rotate by activating a set of motors 120.

In this way, the ATM device may cause security bar 108 to rotate to align first slot 106 and second slot 110 prior to dispensing cash.

As further shown in FIG. 8, process 800 may include dispensing cash after causing the first slot and the second slot to align (block 840). For example, the ATM device (e.g., using motor 120, controller 610, processor 720, and/or the like) may dispense cash after causing first slot 106 and second slot 110 to align. In some implementations, the ATM device may dispense cash via first slot 106 and second slot 110. Additionally, or alternatively, the ATM device may dispense a receipt, a check, a transaction card, and/or the like via first slot 106 and second slot 110. Additionally, or alternatively, the ATM device may receive a deposit of cash, a check, a transaction card, and/or the like via first slot 106 and second slot 110.

In some implementations, the ATM device may detect completion of a transfer between the ATM device exterior and the ATM device interior using a sensor. For example, the sensor may include a pressure sensor, a motion sensor, and/or the like that can detect removal of an object and/or placement of an object in first slot 106 and/or second slot 110. In some implementations, the ATM device may cause security bar 108 to rotate such that first slot 106 and second slot 110 are not aligned (e.g., after detecting completion of a transfer between the interior of the ATM device and the exterior of the ATM device).

In this way, the ATM device may dispense cash after causing first slot 106 and second slot 110 to align.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

In this way, an ATM device may be configured with security bar 108. This increases a security of the ATM device relative to using a door to secure a slot of the ATM device associated with dispensing cash, receiving cash, and/or the like by reducing or eliminating security vulnerabilities that would otherwise be associated with using the door. For example, use of security bar 108 may reduce or eliminate leverage points that can be accessed from an ATM device exterior relative to use of a door. In addition, and as another example, security bar 108 may be more difficult to puncture relative to a door. Further, this reduces or eliminates costs associated with repair and/or maintenance that would be consumed in association with repairing and/or maintaining a door, which may be more mechanically complex and/or include additional elements relative to security bar 108.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An automated teller machine (ATM) device, comprising:

a security bar;

one or more memories; and one or more processors, communicatively coupled to the one or more memories, to:

receive user identification information associated with a user;

authenticate the user based on the user identification information;

cause the security bar to rotate to align a first slot of the ATM device and a second slot of the security bar, the security bar being aligned in parallel with the first slot;

dispense cash after causing the first slot and the second slot to align;

detect completion of a transfer between an ATM device exterior and an ATM device interior using a sensor; and cause, based on detecting completion of the transfer, the security bar to rotate so that the first slot of the ATM device is not aligned with the second slot.

2. The ATM device of claim 1, where the cash is dispensed through the first slot after the first slot and the second slot are aligned.

3. The ATM device of claim 1, where the cash is dispensed through the second slot after the first slot and the second slot are aligned.

4. The ATM device of claim 1, where the cash is dispensed through the first slot and the second slot after the first slot and the second slot are aligned.

5. The ATM device of claim 1, where the one or more processors when causing the security bar to rotate so that the first slot of the ATM device is not aligned with the second slot, are to:

cause the security bar to rotate from a first position to a second position; and lock the security bar in the second position to block access to the ATM device interior.

6. The ATM device of claim 1, where a width of the first slot is narrower than a diameter of the security bar.

7. The ATM device of claim 1, where the user identification information includes at least one of:

a personal identification number (PIN), a transaction card number, a security token, a username/password combination, or biometric information.

8. A method, comprising:

authenticating, by an automated teller machine (ATM) device, a user based on user identification information;

causing, by the ATM device, a security bar to rotate to align a first slot of the ATM device and a second slot of the security bar;

dispensing, by the ATM device, cash after causing the first slot and the second slot to align;

detecting, by the ATM device, completion of a transfer between an ATM device exterior and an ATM device interior using a sensor; and causing, by the ATM device and based on detecting completion of the transfer, the security bar to rotate so that the first slot of the ATM device is not aligned with the second slot.

9. The method of claim 8, where the sensor is a pressure sensor or motion sensor that can detect removal of an object or placement of an object in the first slot and/or the second slot.

10. The method of claim 8, wherein causing the security bar to rotate so that the first slot of the ATM device is not aligned with the second slot comprises:

causing the security bar to rotate from a first position to a second position; and locking the security bar in the second position to block an area between the ATM device interior and the ATM device exterior.

11. The method of claim 8, where the cash is dispensed through the first slot after the first slot and the second slot are aligned.

12. The method of claim 8, where the cash is dispensed through the second slot after the first slot and the second slot are aligned.

13. The method of claim 8, where the cash is dispensed through the first slot and the second slot after the first slot and the second slot are aligned.

14. The method of claim 8, further comprising:

verifying the user identification information with user identification information stored on a secure element of a transaction card placed within communicative proximity of a reader of the ATM device.

15. An automated teller machine (ATM) device, comprising:

a security bar;

one or more memories; and one or more processors, communicatively coupled to the one or more memories, to:

authenticate a user based on receiving user identification information;

cause the security bar to rotate to align a first slot of the ATM device and a second slot of the security bar, the security bar being aligned in parallel with the first slot;

receive a deposit after causing the first slot and the second slot to align;

detect completion of a transfer between an ATM device exterior and an ATM device interior using a sensor; and cause, based on detecting completion of the transfer, the security bar to rotate so that the first slot of the ATM device is not aligned with the second slot.

16. The ATM device of claim 15, where the sensor is a pressure sensor or a motion sensor that can detect removal of an object or placement of an object in the first slot and/or the second slot.

17. The ATM device of claim 15, where the deposit is received through the first slot after the first slot and the second slot are aligned.

18. The ATM device of claim 15, where the deposit is received through the second slot after the first slot and the second slot are aligned.

19. The ATM device of claim 15, where the deposit is received through the first slot and the second slot after the first slot and the second slot are aligned.

20. The ATM device of claim 15, where the one or more processors are further to:

verify the user identification information with user identification information stored on a secure element of a transaction card placed within communicative proximity of a reader of the ATM device.

* * * * *